(12) United States Patent
Delman

(10) Patent No.: US 10,653,117 B2
(45) Date of Patent: May 19, 2020

(54) PORTABLE NIPPLE BASED ANIMAL WATERER

(71) Applicant: ChickenWaterer.com, LLC, Palo Alto, CA (US)

(72) Inventor: H. Mark Delman, Palo Alto, CA (US)

(73) Assignee: Chickenwaterer.com LLC, Palo Alto, CA (US)

( * ) Notice: Subject to any disclaimer, the term of this patent is extended or adjusted under 35 U.S.C. 154(b) by 281 days.

(21) Appl. No.: 15/789,656

(22) Filed: Oct. 20, 2017

(65) Prior Publication Data

US 2018/0035649 A1    Feb. 8, 2018

Related U.S. Application Data

(63) Continuation-in-part of application No. 15/048,799, filed on Feb. 19, 2016, now abandoned, which is a continuation of application No. 13/797,389, filed on Mar. 12, 2013, now Pat. No. 9,265,231.

(60) Provisional application No. 61/622,147, filed on Apr. 10, 2012.

(51) Int. Cl.
    *A01K 39/02*    (2006.01)
    *B23P 17/00*    (2006.01)
    *A01K 7/06*     (2006.01)

(52) U.S. Cl.
    CPC ............ *A01K 39/0213* (2013.01); *A01K 7/06* (2013.01); *B23P 17/00* (2013.01); *Y10T 29/49826* (2015.01)

(58) Field of Classification Search
    CPC .......... A01K 39/00; A01K 39/02; A01K 7/06; A01K 7/00; A01K 7/025

USPC ................................ 137/272, 283, 299, 300
    See application file for complete search history.

(56) References Cited

U.S. PATENT DOCUMENTS

| | | | | |
|---|---|---|---|---|
| 868,794 A | * | 10/1907 | Midgett | F04D 17/165 137/565.35 |
| 3,476,088 A | * | 11/1969 | Smith | A01K 7/06 119/72.5 |
| 3,486,735 A | * | 12/1969 | Smith | A01K 7/06 251/303 |
| 3,513,811 A | * | 5/1970 | Graham | A01K 7/06 119/72.5 |
| 3,527,193 A | * | 9/1970 | Smith | A01K 7/06 119/72.5 |
| 3,529,575 A | * | 9/1970 | Schalk | A01K 1/0356 119/72.5 |
| 4,370,948 A | * | 2/1983 | Atkins | A01K 7/06 119/72.5 |
| 4,527,513 A | * | 7/1985 | Hart | A01K 39/04 119/51.5 |

(Continued)

FOREIGN PATENT DOCUMENTS

JP        02209533 A  *  8/1990

*Primary Examiner* — Lisa L Tsang
(74) *Attorney, Agent, or Firm* — Ferguson Braswell Fraser Kubasta PC

(57) ABSTRACT

A portable animal waterer includes a bulbous manifold formed from a manifold wall, a connector formed from an extension of the bulbous manifold, a first valve hole on the bulbous manifold in the manifold wall and a second valve hole on the bulbous manifold in the manifold wall, substantially opposite to the first valve hole. The first valve hole is configured to receive a first valve and the second valve hole is configured to receive a second valve.

19 Claims, 9 Drawing Sheets

(56) References Cited

U.S. PATENT DOCUMENTS

| | | | | |
|---|---|---|---|---|
| 5,003,927 | A | * | 4/1991 | Thompson ............... A01K 7/06 119/72.5 |
| 5,303,674 | A | * | 4/1994 | Hyde, Jr. ............... A01K 39/00 119/77 |
| 5,709,170 | A | * | 1/1998 | Gerbo ..................... A01K 7/06 119/71 |
| D504,546 | S | * | 4/2005 | Vrielink ........................ 137/272 |
| 7,707,967 | B2 | * | 5/2010 | Kleinsasser ........ A01K 39/0213 119/72.5 |
| 7,780,013 | B1 | * | 8/2010 | Kern ..................... A62C 33/00 137/272 |
| 8,844,467 | B1 | * | 9/2014 | Folkerts, Jr. ............. A01K 7/06 119/72.5 |
| 9,814,213 | B1 | * | 11/2017 | Lane ................. A01K 39/0213 |
| 2005/0067015 | A1 | * | 3/2005 | McKeague ............... E03B 9/04 137/299 |
| 2009/0188434 | A1 | * | 7/2009 | McMullen ............. A01K 39/02 119/72 |
| 2012/0318202 | A1 | * | 12/2012 | Schumacher .......... A01K 39/02 119/74 |
| 2014/0239215 | A1 | * | 8/2014 | Cardaropoli ....... A01K 39/0213 251/319 |
| 2017/0164586 | A1 | * | 6/2017 | Golden ............. A01K 39/0213 |
| 2018/0360001 | A1 | * | 12/2018 | Connolly ............ A01K 39/026 |

* cited by examiner

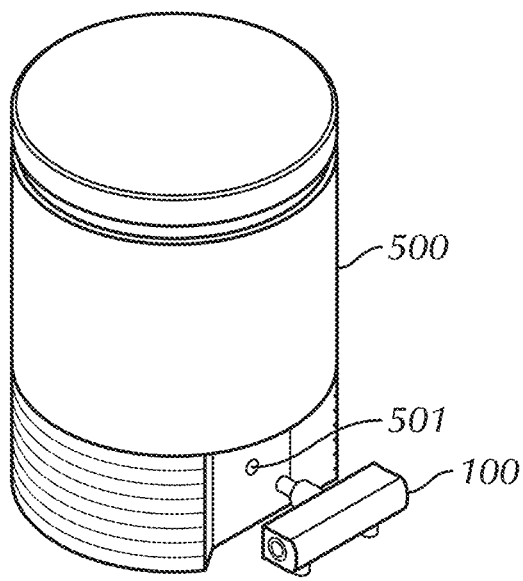 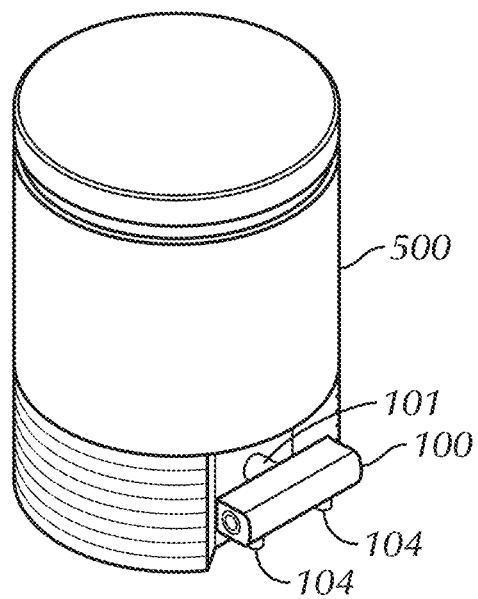
FIG. 5　　　　　FIG. 6
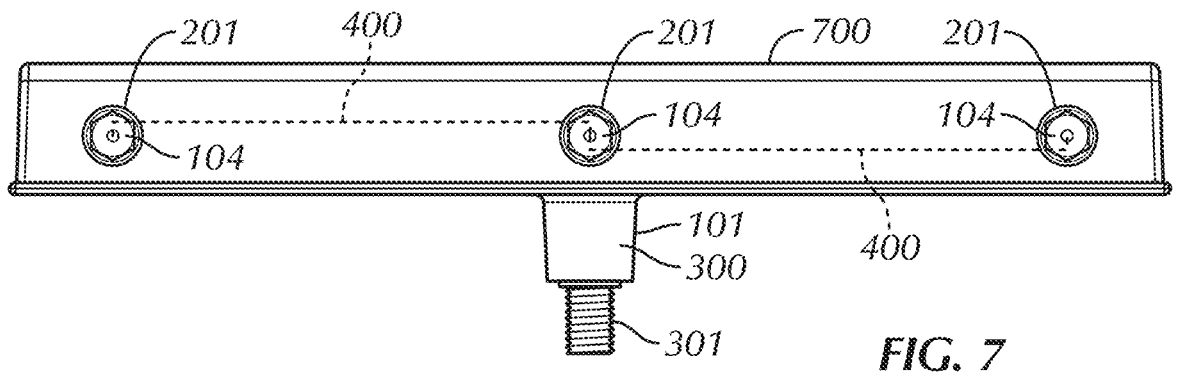
FIG. 7

PORTABLE NIPPLE BASED ANIMAL WATERER

CROSS-REFERENCE TO RELATED APPLICATIONS

This application is a continuation in part of U.S. patent application Ser. No. 15/048,799 filed Feb. 19, 2016. Accordingly, the present application claims benefit of U.S. patent application Ser. No. 15/048,799 under 35 U.S.C. § 120. Ser. No. 15/048,799 filed on Feb. 19, 2016 is a continuation of Ser. No. 13/797,389 filed on Mar. 12, 2013. U.S. patent application Ser. No. 13/797,389 is a non-provisional of U.S. Provisional Application No. 61/622,147, filed on Apr. 10, 2012, and entitled: "PORTABLE NIPPLE BASED POULTRY WATERER," Accordingly, this application claims priority to U.S. Provisional Application No. 61/622,147 under 35 U.S.C. § 119(e). U.S. Provisional Application No. 61/622,147, U.S. patent application Ser. No. 13/797,389 and U.S. patent application Ser. No. 15/048,799 are hereby incorporated by reference in their entirety.

BACKGROUND

Technical Field

One or more embodiments of the present invention relate to poultry watering systems, particularly to those that are portable and dispense water to poultry through poultry nipple valves.

Background Art

Water is an essential element that is required by all organisms in order to perform the metabolic processes required to grow, reproduce, and respond to their environments. Not surprisingly, the provision of safe drinking water is a concern to those involved in animal husbandry and pet keeping. The need for fresh water is particularly important in the raising of poultry: Poultry need water to soften and digest their food since their diet consists of feed and seeds that are normally quite dry. Poultry need water to properly regulate their body temperature because birds use a highly water-intensive process known as evaporative cooling in order transfer heat from their bodies to the air. Finally, poultry need water to lay eggs because eggs are 75% water by weight.

There is a large body of prior art in the field of animal watering systems. One category of watering system dispenses the water into a pan or trough. In such systems, the water is directly exposed to the open air and animals drink by scooping up the water in their mouths and/or beaks. For example, U.S. Pat. Nos. 778,624; 1,933,723; 1,983,613; 3,063,217; 3,675,627; 4,794,881; 5,218,926; 6,079,361; and 7,735,455 B2 represent such open-pan or open-trough systems intended for poultry. Similar systems are used for cats and dogs as shown in U.S. Pat. Nos. 6,718,911 B2; 5,105,768; and 6,067,935 as well as for horses as in U.S. Pat. No. 5,809,934. U.S. Pat. No. 3,921,587 represents an open pan systems that has been configured with a series of paddles. These paddles are intended to remove particulates that might fall into the open trough as a result of exposure to the environment.

A second category of watering systems distributes water to animals (particularly livestock such as chickens, turkeys and pigs) via a series of connected pipes that are fitted with special valves generally referred to as poultry nipples. In such systems, the water is not exposed to the open air because it is transported to the animals via closed pipes and then dispensed via the poultry nipples attached to those pipes. Specifically, the animal drinks by pecking at a stem located at the base of the poultry nipple. This pecking action opens a valve inside the nipple that then dispenses a quantity of water directly into the animal's mouth. U.S. Pat. No. 1,912,530 was one of the first of these closed systems and there is a large body of prior art for such systems including, for example, U.S. Pat. Nos. 2,775,227; 3,263,652; 3,610,206; 3,664,305; 3,724,425; 4,491,088; and 5,099,798.

Generally, nipple based watering systems are connected to a fixed water tank or municipal water line. A water pressure regulator unit is often added to the design in order to reduce the incoming water pressure to a level that is commensurate with the proper functioning of the poultry nipples.

Nipple based systems also incorporate components that allow them to be cleaned of particulates and/or bacteria that might enter the watering system from the water source. For example, U.S. Pat. No. 4,669,422 uses inlet and exit valves to pressure flush the watering system. U.S. Pat. No. 5,025,754 uses a pump, motor, tank, and pipe fittings to drive disinfectant through the system. U.S. Pat. No. 5,136,983 uses a water-regulator bypass valve, self-sealing caps, and exit valve to enable high-pressure flushing.

Open and closed watering systems (particularly those that incorporate stretches of pipework, conduit or water channels) are frequently equipped with mechanisms to prevent poultry from perching upon, or above, the watering system. For example, these watering systems include a wide range of components designed to prevent this perching, or roosting such as: wire barriers, electrified wire, gabled tops on which birds have difficulty perching and various other mechanical barriers and de-stabilizing mechanisms that discourage roosting. U.S. Pat. Nos. 3,122,131; 3,285,227; 4,669,422; 5,097,798; 5,025,754; 5,184,570; 5,230,302; 5,239,944; and 6,933,446 represent such anti-roosting features.

SUMMARY

In general, in one aspect, the invention relates to a portable animal waterer. The portable animal waterer includes a bulbous manifold formed from a manifold wall; a connector formed from an extension of the bulbous manifold; a first valve hole disposed on the bulbous manifold in the manifold wall, wherein the first valve hole is configured to receive a first valve; and a second valve hole disposed on the bulbous manifold in the manifold wall, substantially opposite to the first valve hole, wherein the second valve hole is configured to receive a second valve.

In general, in one aspect, the invention relates to a method to manufacture a portable animal waterer. The method includes providing a bulbous manifold comprising an extension that forms a connector; disposing a first valve hole on the bulbous manifold; disposing a second valve hole on the bulbous manifold, wherein the second valve hole is located substantially opposite to the first valve hole, on the bulbous manifold; and installing a first and a second valve in the first and the second valve hole, respectively.

Other aspects and advantages of the invention will be apparent from the following description and the appended claims.

BRIEF DESCRIPTION OF DRAWINGS

FIG. 5 is perspective view of an un-mounted portable nipple based poultry waterer and a representative water vessel into which an appropriate sized hole is drilled according to one or more embodiments of the present invention.

FIG. 6 is perspective view of a portable nipple based poultry waterer mounted to a representative water vessel according to one or more embodiments of the present disclosure.

FIG. 7 is a bottom view of a portable nipple based poultry waterer with increased nipple feeder distance according to one or more embodiments of the present disclosure.

FIG. 11A is a perspective view and FIG. 11B is a cross-sectional view.

FIG. 15A is a perspective view and FIG. 15B is a cross-sectional view.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

One or more embodiments of the present disclosure relate generally to poultry waterers, particularly to those that are portable and dispense water via poultry nipples or valves. One or more embodiments of the present invention may provide a highly sanitary, portable and economical means to provide clean water to poultry. While the following description primarily covers the use of the waterer for raising poultry, those skilled in the art will appreciated that the waterer is equally suitable for use with other animals as well.

FIGS. 1-15B show various views of a portable nipple-based animal waterer (also known as the portable animal waterer) according to one or more embodiments of the present invention. The particular examples shown in FIGS. 1-6, 11A and 11B show a manifold fitted with two poultry nipples. As will be explained in greater detail later, the maximum number of chickens that can be accommodated by a nipple-based poultry waterer is a function both of the number of poultry nipples and the capacity of the water vessels, also known as portable water containers or water storage vessels, that feeds them. The minimum number of poultry nipples that a nipple-based poultry watering system must have is one poultry nipple. However, there may be instances when a nipple might clog, or malfunction in some other way, so as to render that nipple inoperable. In such a circumstance, it would be advantageous to have a second poultry nipple that would function as a backup to the first poultry nipple.

Figure 11B:
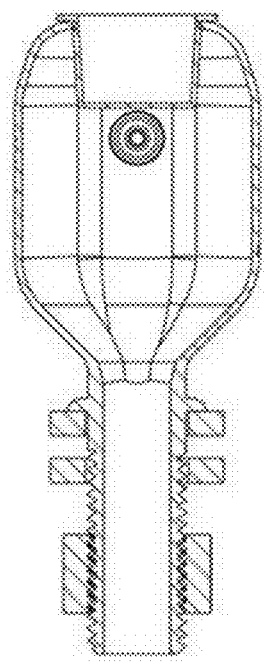
FIGS. 11A and 11B show a portable nipple based animal waterer according to one or more embodiments of the present disclosure.
Figure 11A:
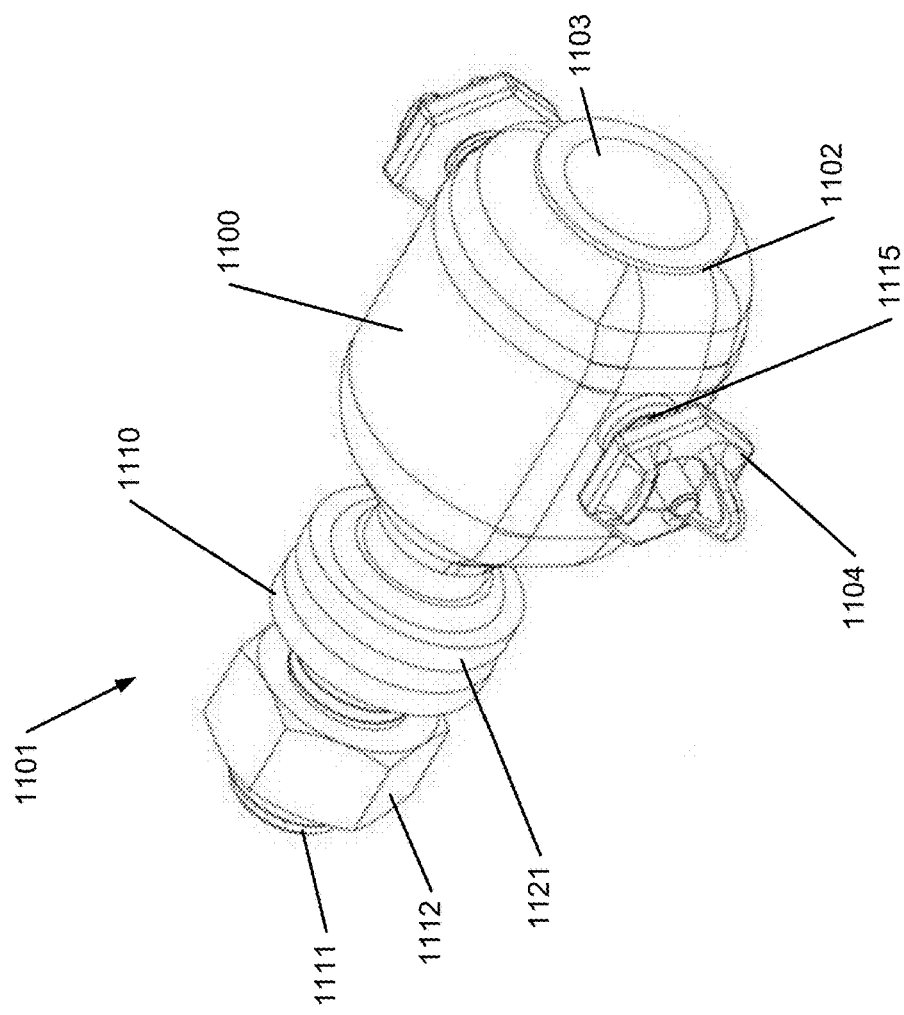

As shown in FIGS. 1-15B, and according to one or more embodiments of the present invention, the animal waterer includes a manifold 100 that is a hollow chamber that is designed to receive fluid from a water storage vessel 500, and to distribute that fluid to a plurality of poultry nipples 104 located on the bottom, sides and/or top of the manifold. For example, two poultry nipples may be installed on opposing sides of the manifold, as illustrated in FIG. 11A. One or more additional poultry nipples may be installed in another vertical plane of the manifold, and/or in a top or bottom horizontal plane of the manifold (not shown in FIGS. 11A and 11B), or anywhere else on the manifold. In one embodiment, the manifold is substantially rectangular in shape. The transference of fluid from the water storage vessel into the manifold is made possible by through-hole 302 located in connector 101. In alternate embodiments of the invention, the diameter of through-hole 302 is increased to enhance water flow between the water storage vessel 500 and manifold 100 and also to facilitate the inclusion of one or more heating devices 120 between the water storage vessel and the manifold. Such a heating device 120 might be passed either through the manifold and into the water storage vessel, or through the water storage vessel and into the manifold and serve to warm the water to prevent freezing. In such an arrangement, the heater may be capable of simultaneously heating liquid contained in both the water storage vessel and the manifold. FIG. 3 and FIG. 11B show different diameters of the through-hole that would allow for passage of fluid between the water storage tank and the manifold. In both cases, fluid will be exchanged between the water storage tank and manifold. However, the through-hole in FIG. 11B is increased to facilitate the passage of the aforementioned heating device(s). During operational use, the poultry watering system is attached to the water storage vessel, or portable water container, 500 by three fittings (gasket 110, washer 111 and nut 112) that work in concert with connector 101 to effectively clamp the portable nipple based poultry waterer to the wall of the water storage vessel. In one or more embodiments of the present invention, other fittings may be used, for example, a single fitting (not shown) may be used that effectively clamps in a similar manner as the gasket 110, washer 111, and nut 112. The manifold of the portable poultry waterer includes clean-out ports 102 that allow users to access the interior of the poultry waterer in order to clean it. During operational use, these clean-out ports are closed using clean-out plugs 103 that create a watertight seal. In one or more embodiments, two such clean-out ports and clean-out plugs are disposed on the manifold. Specifically, the clean-out ports are located on the left and right sides of the manifold. It should be understood, that alternative embodiments of the invention might incorporate no cleanout ports, or one clean out port and plug, or any number of clean out ports and plugs. Additionally, one or more embodiments of the present invention may provide the position of theses clean-out ports and clean-out plugs in other locations along the body of the manifold other than the locations shown in FIGS. 1, 2, 3, 5, 6, and 8.

As shown in FIGS. 1-6, and according to one or more embodiments of the present invention, the manifold 100 is substantially rectangular in shape and hollow so that it can hold a quantity of fluid. Ports, nipple holes or valve holes 200 are longitudinally spaced along the bottom of the manifold 100 to accommodate the insertion of poultry nipples or valves 104. Commonly, the upper section 105 of such poultry nipples or valves 104 are threaded so that they can be screwed into various conduits. In one or more embodiments of the present invention, the bottom of the manifold 100 may incorporate a plurality of raised pads 201 that surround the ports or valve holes 200 to accommodate the insertion of poultry nipples or valves 104. The raised pads 201 are circular in shape and have a dimension that is wider than that of the poultry nipples or valves 104. The pads 201 serve to thicken the manifold 100 in the area adjacent to where the nipple 104 is inserted in order to facilitate a watertight seal between the threaded section 105 of the poultry nipple or valve 104 and the side of the ports or valve holes 200. Further, in case of a curved manifold wall, the pads may establish a flat surface for installation of the poultry nipples. During the course of normal use, a user might decide to replace a poultry nipple or valve 104 and, in the course of so doing, accidentally damage the port or valve hole 200. In such an instance, it would be possible to place a gasket (not shown), or O-ring, over the threaded section 105 of the poultry nipple prior to inserting the nipple in the manifold in order to create a better seal. In such a circumstance, the flat structure of pads 201 provides a good surface for the gasket or O-ring to mate between the manifold 100 and the shoulder section 106 of the poultry nipple or valve 104.

Figure 1:
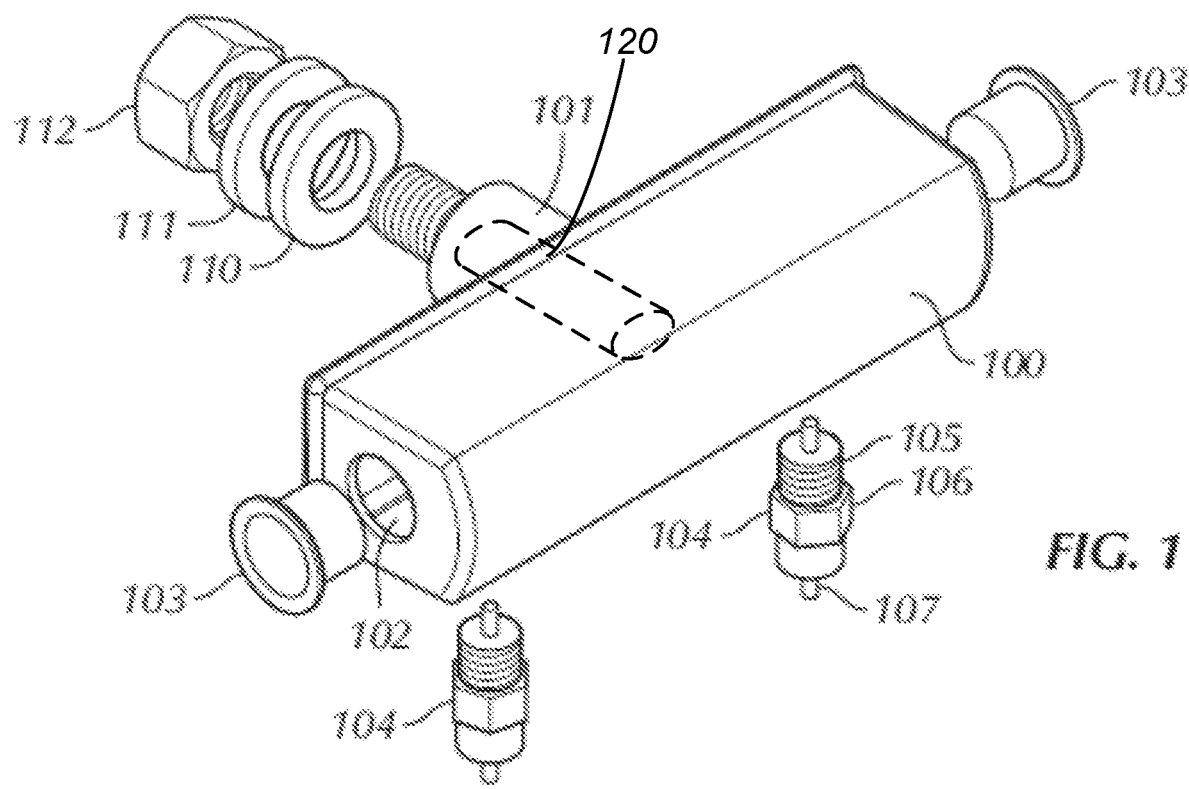
FIG. 1 is an exploded frontal-perspective view of a portable nipple based poultry waterer according to one or more embodiments of the present disclosure.
Figure 2:
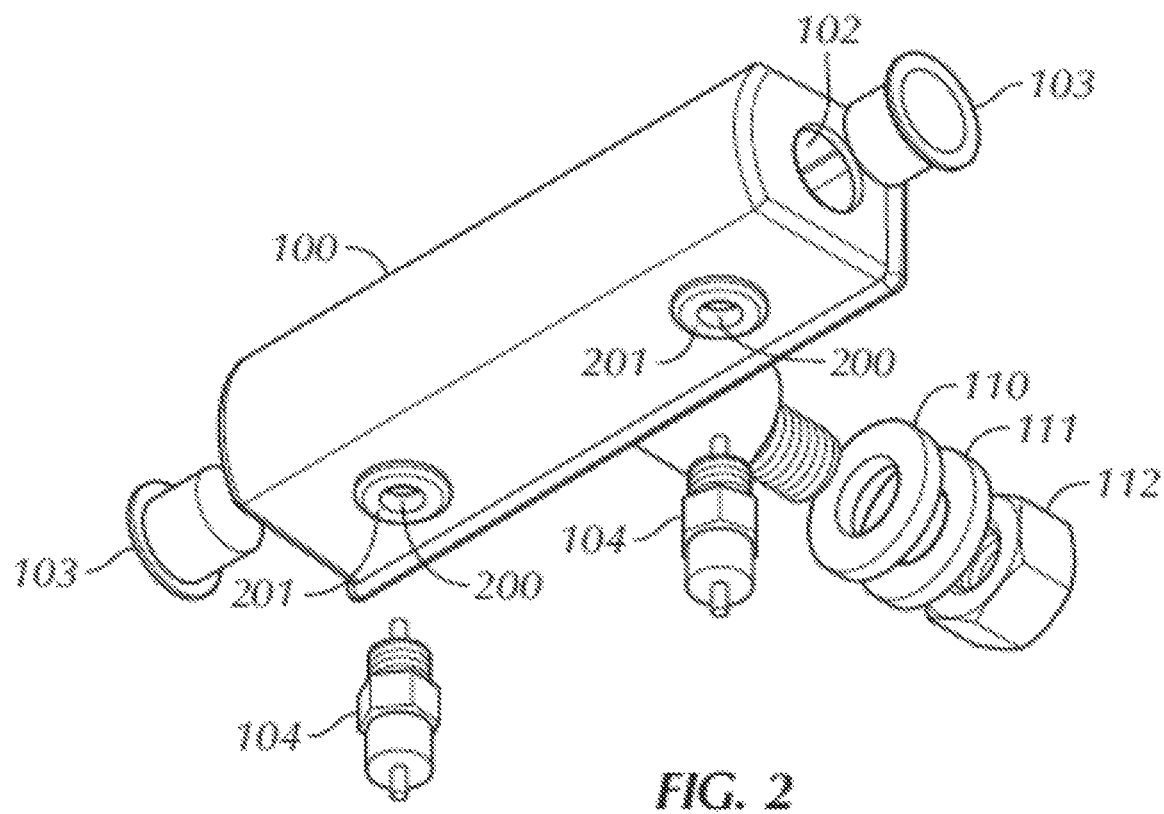
FIG. 2 is an exploded bottom-perspective view of a portable nipple based poultry waterer according to one or more embodiments of the present disclosure.
Figure 3:
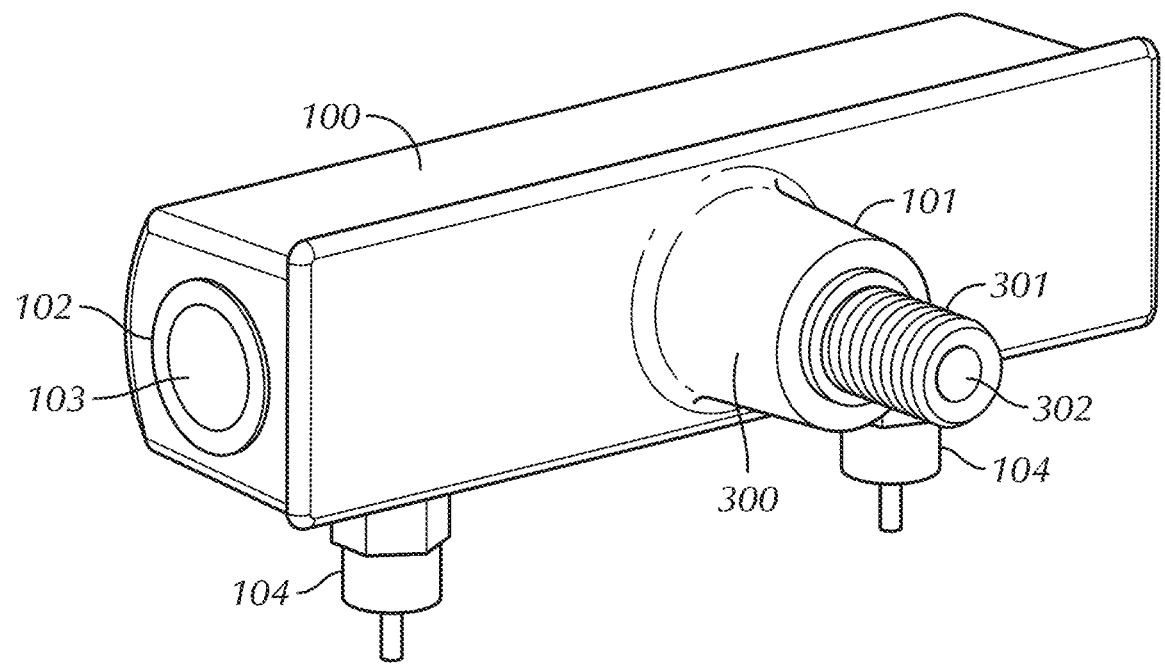
FIG. 3 is a rear-perspective view of a portable nipple based poultry waterer according to one or more embodiments of the present disclosure.
Figure 4:
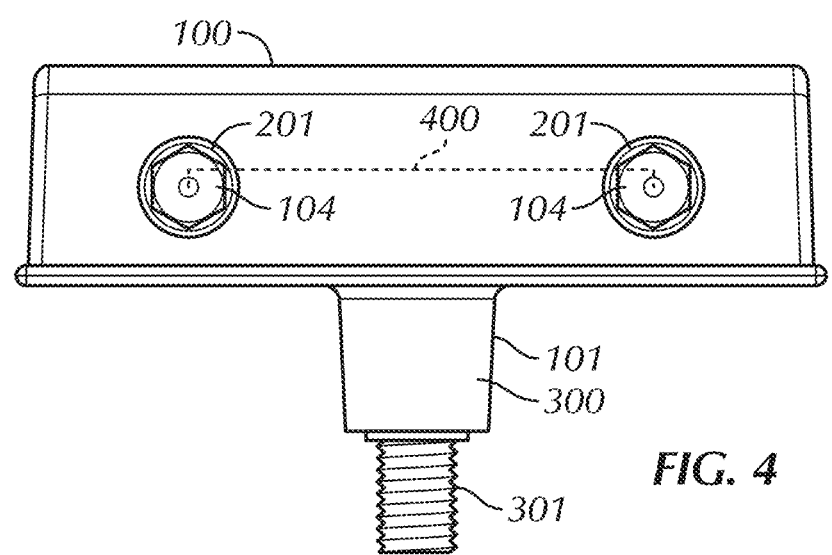
FIG. 4 is a bottom-view of a portable nipple based poultry waterer according to one or more embodiments of the present disclosure.

As shown in at least FIGS. 1-6, 11A, 11B and 15A, ports 200 provide an opening for the insertion of poultry nipples or valves 104. Specifically, as shown in FIGS. 2 and 4, the ports or valve holes 200 are separated by a nipple feeder distance 400. When drinking from the portable nipple based poultry waterer, birds need physical space adjacent to the poultry nipples in which to position their bodies. FIGS. 1-6 show a portable poultry waterer in accordance with one or more embodiments of the present invention where 2 poultry nipples or valves 104 are added to the manifold 100 and the nipple feeder distance 400 is 3.5 inches (8.9 cm). In such a system, two birds may drink simultaneously from the portable poultry waterer by positioning their bodies in a way as to share some of the physical space between the nipples or valves 104, while individually occupying a larger physical space on the side of nipple that is unshared. In such a situation, the nipple feeder distance 400 can be relatively short.

Further, according to one or more embodiments of the present invention, when a third, or more, poultry nipple is added to the manifold, birds drinking from the central nipple(s) may not have unshared space. By unshared space, it is meant that the bird drinking at the central nipple(s) has birds on either side that are simultaneously drinking. In such circumstances, it is possible to increase the nipple feeder distance 400 in order to provide additional physical space for those birds drinking at the central nipple(s). FIG. 7 shows an example of an embodiment where the nipple feeder distance 400 is increased to 6 inches (15.2 cm). Such a distance would provide comfortable physical space for poultry such as chickens.

Further, according to one or embodiments of the present invention, the nipples can be mounted horizontally and/or vertically, and in multiple planes of the manifold, allowing chickens to drink from various locations around the manifold, e.g., on the sides, on a top and/or a bottom surface of the manifold, or anywhere else on the manifold. Depending on the number and placement of nipples in the manifold the nipple feeder distance may be increased or decreased to allow birds the physical space they need to access and drink from the nipples. One such example of this is shown in FIG. 11A where two poultry nipples or valves (1104) have been mounted horizontally in the sides of the manifold (1100). When the manifold is connected to the portable water container, the poultry nipples and the valve holes that accommodate the poultry nipples may be in planes perpendicular to the ground surface on which the portable water container is placed. Here the nipple feeder distance may be shortened because drinking birds drink from opposite sided of the conduit and therefore share little physical space.

FIGS. 1-4, 6-8 and 11A show the use of poultry nipples in the portable nipple based poultry waterer. Particularly, in FIGS. 1 and 2, for example, the portable nipple based poultry waterer is shown fitted with poultry nipples or valves 104 that screw into the manifold 100. However, according to one or more embodiments of the present invention, it should be understood that the portable nipple based poultry waterer can also accept other styles of poultry nipples including, but not limited to, a style of nipple that is commonly referred to as a "push-in" style poultry nipple (not shown). Such push-in style nipples have an upper section (not shown) that is substantially smooth and devoid of threads. With such push-in style nipples, attachment to a water conduit is effected by way of a cup shaped gasket. This gasket is placed into a port in the conduit with a portion of the gasket sitting on the outside of the manifold and a portion of the gasket fitting into the port hole itself. The poultry nipple is then attached by pushing the smooth upper section of the poultry nipple through the gasket and into the manifold. The sides of the nipple press against the gasket creating a watertight seal between the nipple and the manifold. In the case of one or more embodiments of the portable nipple based poultry waterer, the port holes or valve holes 200 are constructed so that they can accept such push-in style nipples and their accompanying gaskets 201. Such an arrangement is shown if FIG. 11A where cup shaped gaskets (1115) are used in conjunction with a horizontally mounted, smooth-barreled nipple or valve (1104) inserted into a valve hole (not shown). Another type of poultry nipples may include a locking mechanism that prevents accidental removal of the poultry nipple from the manifold. Such a locking mechanism may, for example, include a hook that is engaged by twisting the poultry nipple after insertion into the manifold. The hook thus engages with either the manifold wall of a structure in the manifold wall that is specifically configured to accommodate the hook. It should also be understood that numerous mechanisms have been devised to start and stop the flow of water in animal drinking devices and that the use of term "poultry nipple" is not specific to any particular style of drinking valve.

According to one or more embodiments of the present invention, the manifold 100 as described above can be constructed from a variety of materials both rigid and semi-rigid. For example the manifold can be made of metal, wood, stone or various types of plastic including, but not limited to, polyethylene, polypropylene, ABS, PVC, polycarbonate, nylon etc. Additionally, manifold 100 can be made of a material that can be either clear or substantially opaque. For example, according to one or more embodiments of the present invention, the manifold is made from a clear plastic material, and therefore, the user is provided with the advantage of being able to see inside the manifold when filling and cleaning the portable nipple based poultry waterer. A clear plastic material facilitates filling because the user can see when air has been evacuated from inside the manifold and it is filled with water. Likewise, cleaning is facilitated because the user can see the impact of a brush or similar cleaning tool in removing debris or biofilm that may have built up on the inside walls of the manifold 100.

Figure 12:
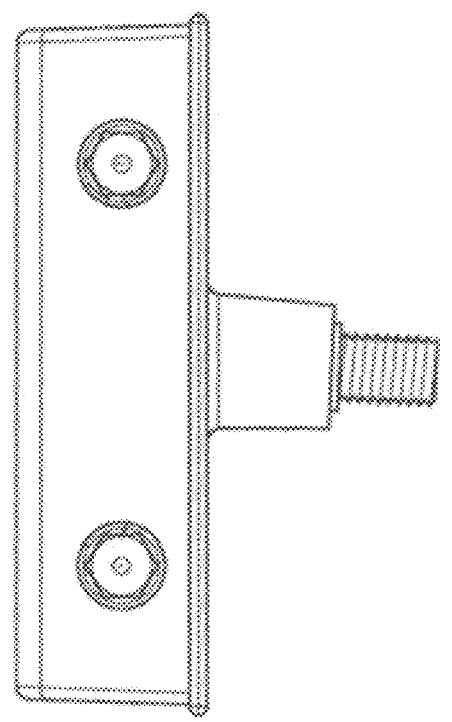
FIG. 12 is a bottom view of a portable nipple based animal waterer manifold shape according to one or more embodiments of the present disclosure.
Figure 13C:
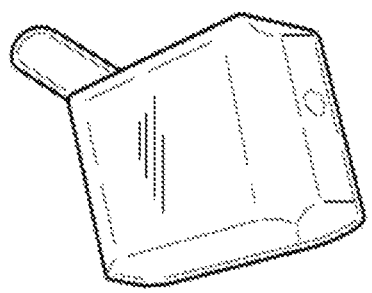
FIGS. 13A, 13B, and 13C are perspective views of portable nipple based animal waterer manifold shapes according to one or more embodiments of the present disclosure.
Figure 13B:
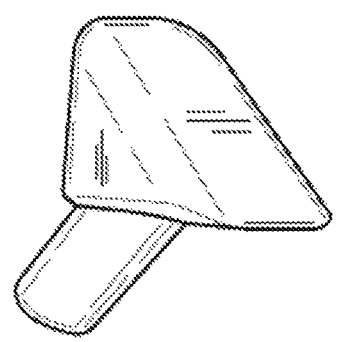
Figure 13A:
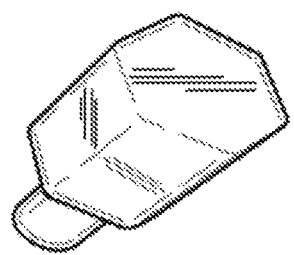
Figure 14:
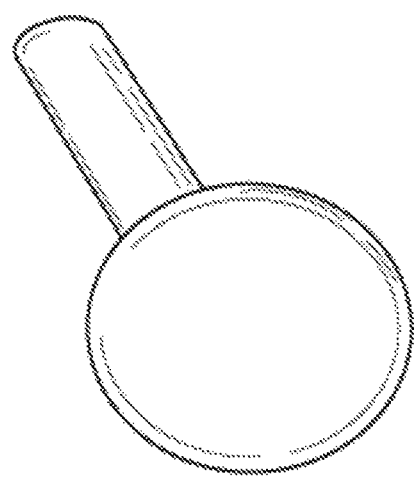
FIG. 14 is a perspective view of a portable nipple based animal waterer manifold shape according to one or more embodiments of the present disclosure.
Figure 15A:
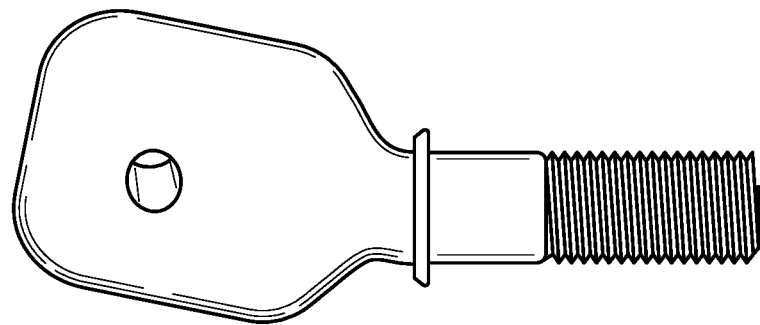
FIGS. 15A and 15B show a portable nipple based animal waterer manifold according to one or more embodiments of the present disclosure.
Figure 15B:
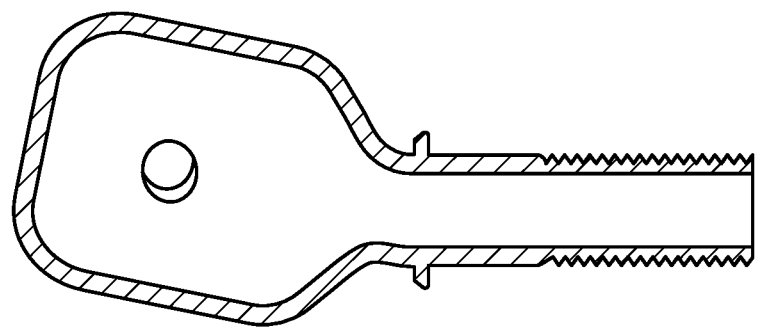

According to one or more embodiments of the present invention, on the back of manifold 100, is a connector 101 that is substantially straight and/or perpendicular to the back surface of the manifold, i.e., there may be a deviation of up to +/−5° from straight and/or perpendicular. In an alternate embodiment of the present invention, the manifold may also be only partially perpendicular to the connector for either functional or aesthetic reasons. An example of such an arrangement is shown in FIGS. 12, 15A and 15B, where the manifold is attached to the connector at an angle that is not 90 degrees. Alternatively or additionally, there may be kink in the connector. It should be understood that a manifold capable of dispensing water may be shaped in a large number of geometries including, but not limited to, spherical, cylindrical, triangular, square, paraboloid, conical, polygonal and other regular and irregular shapes such as those depicted in FIGS. 13 & 14. The walls of these various shapes may intersect at an acute or obtuse angles or may gently curve into each other as would be the case with a spherically shaped manifold (FIG. 14) or in a substantially regular geometric shape whose sides have been chamfered or filleted. In one or more embodiments of the invention, the manifold has a bulbous shape, as illustrated in FIGS. 11A and 11B. This bulbous manifold (1100) includes a protuberant cavity that may be produced, for example, using a blow-molding process. The bulbous manifold may have a variety of shapes, including, but not limited to, the shapes shown in FIGS. 11A and 11B, 13A-C and 14. In one or more embodiments of the invention, the wall of the bulbous manifold gently curves, thus avoiding sharp corners and/or edges. If the bulbous manifold includes planar sections, as illustrated in FIG. 11A, these planar surfaces may gently transition into other curved sections of the bulbous manifold. A connector (1101) may interface with the bulbous manifold (1100). The connector (1101) may include a dedicated flange section (1121) (shown, for example, in FIGS. 11A and 11B) or a section 300, also known as an unthreaded portion, that is closest to the manifold, and a narrower, threaded section 301, also known as a threaded portion, as illustrated, for example, in FIG. 3. The relative position and size of the section 300 and the threaded section 301 allow the portable poultry waterer to be mounted to a water vessel 500. This is accomplished by passing the narrower threaded section 301 into a hole 501 in the water vessel 500 that is of a substantially similar in size to threaded section 301. The wider section 300, having a larger diameter than the both threaded section 301 and the hole in the water vessel 500, would not be able to pass through the hole 501. Thus, section 300 would necessarily be positioned outside the water vessel 500 while section 301 would be inside the water vessel 500.

In an alternate embodiment of the present invention, the unthreaded and threaded sections of the connector may be of substantially uniform diameter and the addition of a wider diameter flange section of the connector may be used to prevent the unthreaded section of the connector from passing through hole in water storage vessel 500. Such an arrangement is shown in FIGS. 11A and 11B where flange section of the connector (1121) creates a wider diameter section of the connector to allow the nipple based poultry waterer to be mounted to a water supply tank.

The portable nipple based waterer is designed to attach to a variety of water storage vessels in which there is a hole that allows the waterer to be mounted. When connected to a water storage container, the connector may enter the portable water container at a wall of the portable water container, substantially surface-normal (i.e., there may be a deviation of up to +/−5° from surface-normal) to the wall of the water container, as illustrated, for example, in FIGS. 5 and 5. There are an infinite number of places on the body of the water storage vessel into which this hole might be situated. For example, a hole may be placed near the very bottom of the water vessel, just above the point where the water storage vessel comes into contact with the surface that supports the water storage vessel. In such a situation, it would be desirable for portable nipple based waterer to be constructed so as to raise the manifold above the hole in the water storage vessel so that the portable nipple based water is more accessible to drinking birds. In an alternate embodiment of the present invention, the connector section may be bent so as to allow the manifold to be placed in different positions relative to the hole in the water storage vessel while still holding the manifold close enough to the exterior wall of the water storage vessel to prevent roosting. Such an arrangement is shown in FIGS. 15A and 15B which show detailed views of the connector section where the bend occurs on the side of the flange that is closest to the manifold. It should be understood that this bend can also occur elsewhere along the connector section and that the bend may be constructed to point upward the top of the water storage vessel, downward towards the bottom of the water storage vessel, to the left or to the right when viewing the water storage vessel from the front, or a combination of these orientations such as upward and to the right.

To achieve a connection between the portable nipple based waterer and a water vessel, a user would then place gasket 110 or 1110, washer 111 and nut 112 or 1112 onto the threaded section 301 or 1111 of the connector 101 or 1101 that is now positioned inside the water vessel 500. When the user tightens nut 112, the wider section 300 of connector 101 is pulled towards the outer wall of the water vessel 500 and connects the poultry watering system to the water vessel 500 due to the clamping forces created by the nut 112 and washer 111. Gasket 110 acts as a mechanical seal to prevent leakage of fluid between the mating surface of the washer 111 and the interior wall of the water vessel 500. FIG. 5 shows a representative water vessel 500 into which a hole 501 is drilled and the portable poultry waterer prior to its attachment to that water vessel. FIG. 6 shows a representative water vessel and the portable poultry waterer after it has been attached as described above.

According to one or more embodiments of the present invention, threaded section 301 has the diameter and thread specification so as to accept a standard ⅝ inch, 11 thread per inch, nut. It should be understood that alternate embodiments of the connector mechanism include those that are configured to accommodate other standard U.S., metric and other international standard nut sizes, thread pitches and through hole diameters. Likewise the length of the threaded section can be such as to attach the portable poultry waterer to water vessels whose walls are of varying thicknesses.

FIG. 6 also shows that when mounted as described above, manifold 100 is held in close proximity to the outer wall of the water vessel 500, and the ends of the manifold 100 are such that they do not extend materially beyond the perimeter of the water vessel 500. To roost, a bird perches on an object with approximately ½ of its body on either side of the perch. The position of manifold 100 relative to the water storage vessel 500 denies the bird approximately ½ of the space it needs to effectively perch. Specifically, the denied space is on the side of the manifold 100 that is closest to the water storage vessel 500. Thus, the position of the manifold 100 relative to that of the wall of the water storage vessel 500 deters roosting.

On occasion, users may wish to have access to the interior of the manifold 100 in order to clean it. This situation may arise if a user knocks debris into the water when filling the portable poultry waterer, or because bacterial film has developed inside the manifold over the course of normal use. In such circumstances, it is possible to access the interior of the manifold to remove these contaminants. Clean-out ports 102 shown in FIGS. 1, 2, 3 and 8 provides this access. The clean-out ports 102 allow the user to flush the manifold 100 with water from a hose or faucet to drive debris and bacteria from the interior of the manifold 100. Alternatively, a user could use a bottlebrush, or similar cleaning instrument, to mechanically dislodge debris and bacteria from the interior of the manifold 100 and or to rinse the interior with a sanitizing solution. It should be understood that the diameter of these clean-out ports may be adjusted as desired. FIGS. 1, 11A and 11B show alternate embodiments of the present invention where the clean-out ports differ in size, with FIGS. 11A and 11B showing clean-out ports 1102 and plugs 1103 with a diameter that is relatively larger than in FIG. 1.

During normal operation of the portable nipple based poultry waterer, the clean-out ports 102 are sealed with clean-out plugs 103. According to one or more embodiments of the present invention, the clean-out plugs 103 are made of plastic and have a tapered barrel. To seal port 102, a user inserts a plug 103 into the open port 102 and pushes it into manifold 100. As the plug 103 is inserted to an increasing depth within the manifold 101, the tightness of the fit between the plug 103 and the sides of the port 102 are correspondingly increased till a watertight seal is achieved. It should be understood that alternate embodiments of plug 103 could be made of a variety of materials including, but not limited to, plastic, cork, rubber etc.

Once the portable nipple based poultry waterer is attached to the water storage vessel 500, a user may fill the water storage vessel with fluid. During normal filling operation, the user partially fills the tank with fluid. The user then tips the portable nipple based poultry waterer and tank forward to allow air trapped inside manifold 100 to bubble out of the manifold 100 through tank 500. The user then returns the portable nipple based poultry waterer and tank to a position substantially parallel with the ground and continues filling the tank. Under the force of atmospheric pressure, the fluid is drawn into the manifold 100 via through-hole 302 located in connector 101. The fluid is then distributed to the poultry nipples or valves 104 by manifold 100. Thirsty birds drink by pecking at a stem 107 located at the base of the poultry nipples 104. This pecking causes the stem 107 of the nipple 104 to rise, opening the valve within the poultry nipple 104. Water is then dispensed into the bird's beak. As mentioned previously, various mechanisms exist to start and stop the flow of water in a valve and the description here is used to illustrate how one such style of valve would be employed in the portable nipple based poultry waterer. When the bird disengages its beak from the nipple 104, the stem 107 falls, closing off the flow of water. As birds draw water from the manifold 100 of the portable poultry waterer, it is automatically replenished from the water storage vessel 500 that continuously re-supplies the manifold 100 with water as a result of the atmospheric pressure. When the water storage vessel 500 is empty, the user refills the tank 500 to provide a fresh supply of water to the poultry.

In an alternate embodiment of the present invention, a clean out port, similar to port 102, may be located in any other location or locations on the manifold 100. Such a clean out port would have multiple functions. As mentioned previously, such a port would allow a point of access to clean the interior of the manifold 100. Additionally, such a port would also be useful when filling the portable nipple based poultry waterer or when adding one or more heater to the portable nipple based poultry water and/or water storage vessel. As described earlier, during normal filling operation, the user tips the portable nipple based poultry waterer forward to allow air trapped inside manifold 100 to bubble out of the manifold 100 through tank 500. A clean out port located on the top of the manifold 100 would speed the filling process and eliminate the need to tip the tank 500 forward in order to drive out any air trapped inside the manifold 100. The user would remove the plug covering this clean out port and then begin filling the tank 500. The water would enter manifold 100 under the force of atmospheric pressure, and any air inside the manifold 100 would be exhausted through the port located on the top of the manifold 100 by the force of the entering water. When the air had been driven out of the manifold 100, the user would replace the plug covering the port on the top of the manifold 100 to seal it.

Alternatively, the port-hole may be opened and closed by way of a ball valve rather than a plug. Ball valves are mechanisms that permit, or restrict, the flow liquids and gasses and are widely used in gas, plumbing and irrigation systems. A small ball valve such as those commonly used in drip irrigation systems can be fitted into the port hole on the top of the manifold 100 using a cup-shaped gasket such as the ones described above. The user would open the valve to allow air to be evacuated from the manifold 100 when filling the portable nipple based poultry waterer. When the air had been driven from the manifold 100 by the force of entering water, the user would close the valve and then continue filling. In one embodiment of the invention, a heater or a poultry nipple may be installed in the port-hole.

As mentioned earlier, the diameter of the port-hole (102) may be increased or decreased as is desirable to the functioning of the overall design of the invention. FIGS. 11A and 11B, show embodiments of the present invention in which a port-hole is relatively larger than the port-holes in FIG. 1. A relatively larger port-hole facilitates the passage of a heating device into the manifold. Such a heating device would have the advantage of warming the water inside the manifold to prevent it from freezing. The heating device might also subsequently be passed through the connector section and into the water storage vessel to warm the water there and prevent it from freezing as well. It should be understood that there are multiple types of heating devices which might be used to warm the water inside the manifold and water storage vessel including, but not limited to, heat cables, canister heaters, silicone pads, etc.

According to one or more embodiments of the present invention, to allow the birds to drink, the portable nipple based poultry waterer could be situated at a height above the ground that places the stem 107 of the poultry nipples at approximately the bird's eye-level. The exact height to position the stem above the ground depends on the type of poultry, the breed and its age. For example, the height for a 1-day old chicken is approximately 4 inches above the ground. For a fully mature chicken, the height is approximately 19 inches above the ground. Users have many options for positioning the portable poultry waterer at the right height for their particular poultry birds. For example, the poultry waterer can be placed on a flat, elevated surface such as a brick(s), a milk crate(s), a cinder block(s), a trees stump, a small table or other convenient object. Alternatively, the portable poultry waterer might be hung from a rope, chain, or hook if the water vessel chosen by the user has a suitable handle, hook or other mounting fixture.

Figure 9:
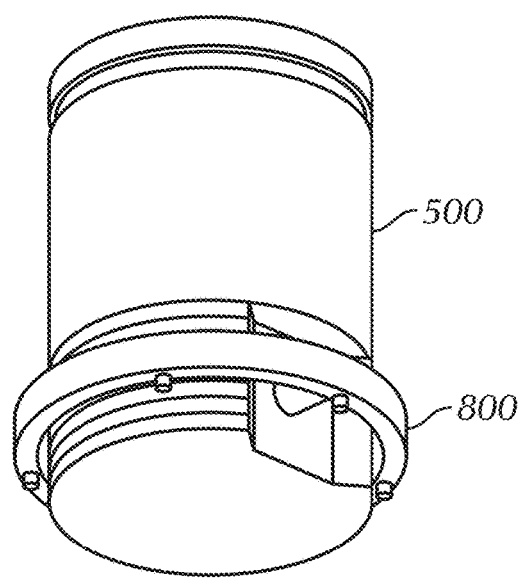
FIG. 9 is a perspective view of a substantially circular portable nipple based poultry waterer that is mounted to a water vessel according to one or more embodiments of the present disclosure.
Figure 10:
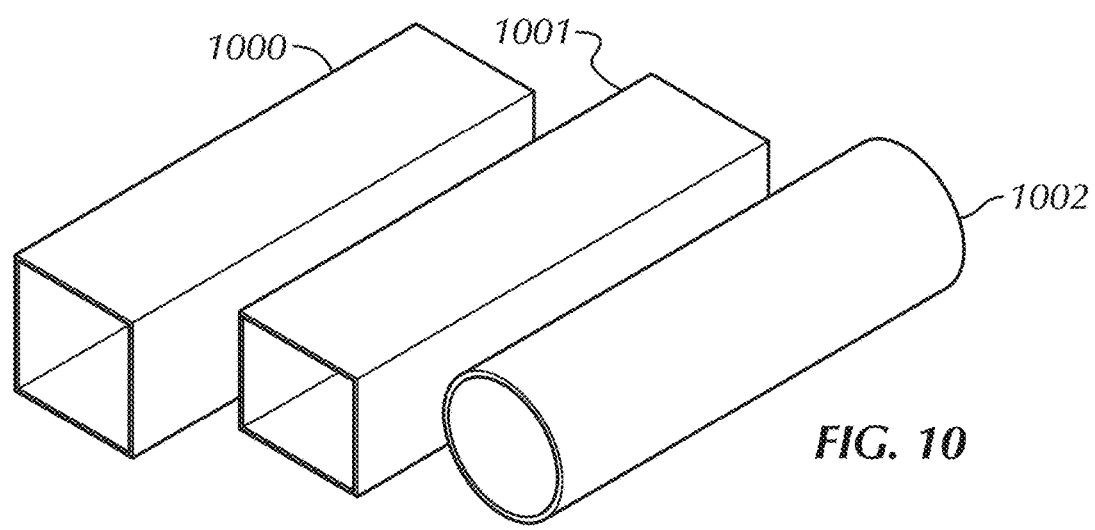
FIG. 10 is a perspective cross-sectional view of a variety of portable nipple based poultry waterer manifold shapes according to one or more embodiments of the present disclosure.

FIGS. 6 and 9 show one or more embodiments of the present invention where the portable poultry waterer is attached to cylindrically shaped water storage vessels. Commercially available water coolers designed for use by humans conforms to this general shape, and are manufactured with a hole 501 into which a spigot is placed. On many such human water coolers, the spigot can be removed, leaving a hole that can be of appropriate diameter for attachment of the portable poultry waterer. These water coolers often include a handle in their design that makes them easy to transport and hang. In consequence, human water coolers are particularly well suited as water vessels for the poultry waterer. However, it should be understood that the portable poultry waterer is designed so that it can be attached to a wide range of water storage vessels into which an appropriate sized hole is drilled. These vessels can be of many different shapes, sizes and water capacities to suit the watering requirements of the flock and the user's aesthetic preferences.

As a general rule of thumb, a poultry nipple is required for every 8 chickens. FIG. 7 shows an embodiment of the portable poultry waterer with a longer manifold 700 and three poultry nipples 104. In this embodiment, the nipple feeder distance 400 is increased to 6 inches (15.2 cm) to provide room for three birds to drink simultaneously from the poultry watering system. Specifically, the nipple feeder distance 400 is increased to provide room for the bird drinking from the central nipple 104. While FIG. 7 shows a portable nipple based poultry waterer with three poultry nipples 104, it should be understood that a portable poultry waterer with additional nipples might be created by increasing the length of the manifold and adding additional ports or valve holes 200 and pads 201 longitudinally to the bottom of the manifold. It should also be understood that the nipple feeder distance might also be increased in order to make an aesthetically pleasing arrangement of nipples along the bottom of the manifold. Likewise, the nipple feeder distance may be decreased if the poultry nipples are situated in the manifold in such a way that birds share relatively little space as would be the case in the alternate embodiments of the present invention shown in FIGS. 11A and 11B.

Figure 8:
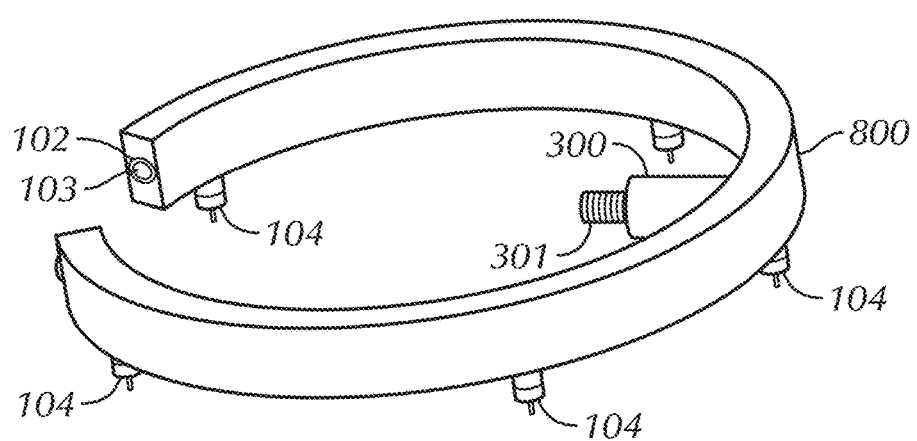
FIG. 8 is a perspective view of a substantially circular portable nipple based poultry waterer according to one or more embodiments of the present disclosure.

As shown in FIGS. 8 and 9, and according to one or more embodiments of the present invention, a manifold 800 is made flexible/semi-rigid plastic and is substantially circular in shape with an internal diameter that is greater or equal to the outer diameter of the portable water container 500. It should be understood that the manifold 800 can be constructed so as to generally mirror the perimeter shape of a variety of water storage vessels including, but not limited to, those that are square, rectangular, triangular, pentagonal etc. Likewise, it should be understood that the overall capacity of the aforementioned water storage container is variable. Users can choose water storage vessels of various capacities and a portable poultry waterer with varying numbers of poultry nipples to match the daily water requirements of their flocks. A general guideline for users is to select a portable nipple based poultry waterer that uses 1 nipple and delivers ½ gallon of water for every 8 birds in the flock. Such a portable poultry waterer would supply said flock with a 1-day supply of water. In other words, the user would only need to fill the portable poultry waterer one time each day to provide a sufficient quantity of water to maintain a flock of 8 birds. A portable poultry waterer pairing two nipples with a two gallons water supply would accommodate a flock of 16 chickens with a 2-day supply of water etc. etc.

It should be further understood that alternative embodiments of the portable nipple based poultry waterer include those with manifolds of various profile shapes. Attention is directed to FIG. 10-14 which show examples of various manifold shapes. However, it should be understood that many other shapes are suitable for the manifold.

To use at least one or more embodiments of the portable nipple based poultry waterer, a user should select a water storage vessel or portable water container. The user has many options with regard to the form factor, cost, fluid capacity, and construction materials for this water storage vessel or portable water container. Water coolers created for human use represent an excellent choice because they are insulated, often include a handle in the design, and generally already have a hole drilled into them to accept a spigot. To remove this spigot does not require the use of tools. The user simply turns the spigot (generally in a counter clockwise direction) until it unscrews from the body of the cooler. Once the spigot is removed, the body of the cooler has an opening into which the user can insert one or more embodiments of the portable nipple based poultry waterer. The user would do so by inserting the threaded end into the hole in the wall of the water cooler until the larger end of the connector mechanism comes into contact with the outer wall of the cooler. The user would then place their other hand inside the cooler and place a gasket, washer and nut in that order onto the threaded end of the connector and tighten the nut until the portable nipple based poultry waterer clamps tightly to the body of the water cooler. No tools are required to effectively make this attachment since a "finger tight" rotation of the nut is all that is required to create a watertight seal.

Such coolers come in a variety of capacities such as 2-gallon, 3-gallon, 5-gallon, 10-gallon etc. A user can choose a cooler size to match the daily water requirements of the flock, or choose a water capacity that would provide several days worth of water for the flock. Such a choice would allow the user to re-fill the water storage container less frequently than once per day.

The range of potential water storage vessels for one or more embodiments of the portable nipple based poultry waterer are almost limitless; for example, other potential water storage vessel include containers such as: plastic pitchers for dispensing beverages, refrigerator water bottles, re-sealable plastic containers used by consumers for food storage, hard-sided water storage containers designed for camping and outdoor recreation, round and square plastic pails used in the food-service industry to store and transport food items, and cube-shaped collapsible plastic liquid containers used by consumers and commercial customers for a wide range of applications to name just a few. All of the above containers are typically made of food grade plastic, come equipped with a removal lid that is large enough for a user to insert their hand into the body of the container for the purpose of mounting the portable nipple based poultry waterer, and have either dedicated handles or hand-holds that make them easy for the user to transport the portable poultry waterer from a water source to the place where the chickens are lodging and back again.

To install one or more embodiments of the portable nipple based poultry waterer into the above mentioned water storage containers would require the user to drill a hole in the side of the container. In the case of one or more embodiments of the present invention, a standard ⅝ inch drill bit would be used to create this hole. Both the drill and the drill bit are commonly available hardware items. In alternate embodiments of the present invention, the connector section may be of larger or smaller diameter and drill bits of varying sizes are widely available to accommodate connector sections of varying diameters.

Users are not required to have specialized training or skill in order to use these tools to create a hole. The user would insert the drill bit into the drill and place the chosen water storage container on a flat surface. The user would then start the drill and press it against the side of the water storage container in a location 2.25 inches or more above the bottom of the storage vessel. This 2.25 inch distance provides clearance between the flat surface onto which the water storage container may be placed and the bottom of the vertically mounted poultry nipples that are situated beneath the manifold of the portable poultry waterer. It should be understood that this distance applies primarily to vertically mounted poultry nipples and that horizontally mounted nipple may require less clearance depending on their placement in the manifold. As will be described later, with the use of certain containers, a user may need to drill a second smaller hole into the top of the water storage vessel to prevent a vacuum from forming inside the water storage container that would slow down the flow of water to the portable nipple based poultry waterer. Once the water storage container has been prepared for use by drilling, one or more embodiments of the portable nipple based poultry waterer could be attached to the water storage container in the same manner as described above.

After the user has completed the installation, the user has many options for filling the water storage container on which the portable nipple based poultry waterer is mounted. One option is to fill the water storage container at an interior water faucet, which is located at a distance from the place where the chickens are lodging, and then carry the portable poultry waterer to that place of lodging using the handles or hand holds on the water storage container. Alternatively, a user can fill the water storage container at an exterior water faucet, a well, a pond, or a stream and then transport the portable nipple based poultry waterer to the chicken's place of lodging in much the same fashion. A user may also decide to place the portable nipple based poultry waterer at the place where the poultry are lodging and then fill the water storage container from a hose that is connected to the municipal water supply or a private well with pump.

To fill the container, the user would pour water into the cavity of the water storage vessel or portable water container until the water level rises above the top of the threaded section of the connector mechanism. The user would then tip the container forward (towards the portable nipple based poultry waterer) so that the portable poultry waterer is temporarily placed closer to the ground then the backside of the container. This tilt in the water storage container would allow any air trapped inside the manifold of the portable nipple based poultry waterer to bubble out of the manifold through the connector hole. The user is able to observe the bubbles rising through the water inside the water container and ascertain when the manifold is substantially free of air because the bubbling would slow or cease. In the case where manifold 100 is made of a transparent material, the user would also be able to visually observe the flow of water into the manifold and the exit of air from the manifold by looking at manifold 100 during filling. Once the air is driven from the manifold, the user would remove the tilt placed on the container and continue filling the water storage container till full.

After filling, the user would place the lid on the water storage container. If the water storage container is such where the lid creates a hermetic, or airtight seal, a vacuum may form inside the water storage container as water is consumed by animals drinking from the watering system. This would slow down the flow of water from the portable nipple based poultry waterer. To prevent this vacuum from forming, the water storage container may need a vent to allow air to enter and break the vacuum. The method to create the vent depends on the water storage container selected by the user. Many brands of water coolers for human use have a vent cap built into the lid. To vent this type of container, the user lifts the cap until it snaps into place. This allows air to enter a small hole located in the cap. Once open, the user does not need touch the cap ever again. However, users would have the option to close the vent if they desired to do so by pushing the vent cap down until it snaps into the closed position. Other brands of water coolers may come equipped with a folding spout built into the lid. To create a vent with this type of water cooler, the user would simply lift the spout. In the upright position, the spout is in the open position and this would allow air to flow into the container through the spout mechanism. For any other type of hermetically sealed container, the user would need to create a vent by drilling a hole in the cap of the container. The hole can be of any size as long as it breaks the hermetic seal and allows air to enter the water storage container. To create this hole, a user can employ any drill bit they have on hand. Once a hole of this type is placed into the lid, the water container will automatically be vented whenever the user replaces the lid on the water storage container.

Once filled and vented, the user can place at least one or more of the embodiments of the portable nipple based poultry waterer in a location where the poultry are lodging. This could be inside a coop, in an enclosed pen, in a paddock area, or an open field where the birds are free ranging. The user would then set one or more embodiments of the portable nipple based poultry waterer at a height off the ground that is approximately eye-level with the birds that are to drink the water. This height depends on the specie of bird and its age. For example, the nipple will be placed relatively close to the ground for baby chickens, higher off the ground for mid-sized game birds such as quail, and higher still for full grown chickens or turkeys.

A user has many options for properly positioning the portable nipple based poultry waterer. A user can set the portable nipple based poultry waterer onto an elevated flat surface created with one or a combination of any of the following materials: a tree stump, bricks, cinder blocks, milk crates, a low table, paving stones, wooden pallets, a wooden or plastic garden box etc. etc. If the water storage container includes a handle, the user might also choose to hang the portable nipple based poultry waterer using a rope or chain suspended from a beam within the coop, a tree branch, a fence post, or a garden hook (also sometimes called a shepherds hook). Because of the many placement options, users of the portable nipple based poultry waterer can increase the height of the portable poultry waterer above the ground as the birds in the flock age and grow. Likewise, users have the option to adjust the height of the watering system if they change the types of birds they choose to keep. For example, a user might first use the watering system for a flock of mid-sized game birds like quail, and at a later date, decide to change their poultry flock to a large breed of chicken such as the Jersey Giant and raise the height of the portable poultry waterer to match the increased height of those large-sized fowl.

Once in position, birds have the opportunity to drink whenever they desire water. One or more embodiments of the portable nipple based poultry waterer automatically provide water to birds whenever they demand it. To take a drink, a bird would position itself adjacent to one of the poultry nipples and peck at the metal stem located at the base of the nipple. Poultry are naturally inquisitive and will peck at various objects in search of food. Poultry nipples are generally made of bright orange or yellow plastic so they catch the bird's attention. A bird will peck at the nipple and cause the stem in the nipple to rise. This opens the valve and water flows down the stem and into the bird's beak. When the bird disengages its beak from the poultry nipple, the stem falls, closing off the flow of water.

After pecking at the nipples several times, the birds quickly learn that they can drink whenever thirsty by pecking at the nipples. Users of poultry nipples have also discovered that it is possible to teach poultry how to use these nipples. To do this, a user taps at the stem of the poultry nipple in the presence of the poultry. The sound of the stem clicking against the wall of the nipple, and the sight of water droplets, attract the birds to the poultry nipples. The user then retracts their finger from the nipple and gives the birds an opportunity to investigate the poultry nipple in greater detail. The bird's natural inquisitiveness is stimulated and the birds begin pecking at the poultry nipples.

As birds drink from the nipples, water is forced from the water storage container into the manifold by the force of atmospheric pressure. When the water storage tank is empty, the user can refill it by carrying the portable poultry waterer to a source of water and filling it there, or by leaving the portable poultry waterer in place and filling it with a hose as described above.

Poultry instinctively perch in places above ground level because it offers shelter from potential predators. They may perch in such places to rest during the day and are particularly apt to perch after the sun goes down in order to sleep. To perch or roost, a bird uses its talons to grasp a tree branch or similarly shaped object, placing the perch beneath its body and with approximately one-half of its body on either side of the perch in order to maintain its balance. Owners of poultry often include specific roosting places in their coop designs to give birds places where they can perch. However, birds will perch on other objects if given the opportunity. As has been mentioned, a water pipe or conduit would provide such a place. From the perspective of the user, a water conduit is an unacceptable perching place. Birds might damage the conduit because of their weight. Additionally, birds perching on the conduit might defecate and soil any poultry nipples that are underneath their roosting place.

To prevent animals from sitting or roosting on one or more embodiments of the portable nipple based animal waterer, the manifold is designed so that animals will not be able to maintain their balance on the manifold. This is achieved by placing the manifold close to the body of the water storage container. If an animal attempts to sit on the manifold of the portable poultry waterer, the animal's body would encounter the wall of the water storage vessel. The animal would not be able to situate itself in a way that would establish a state of equilibrium (gravitational balance). As a result, the animal would be forced to abandon its effort to sit on the manifold. In practice, animals have an intuitive understanding of the space required for them to sit and may not even test whether it is possible for them to sit on the manifold, based on their observation of the manifold. In one or more embodiments of the invention, the dimensions to prevent roosting are selected in an animal-specific and/or animal size-specific manner. For example, for baby chicks, finches and hamsters, a total distance from the wall of the water storage container to the end of the manifold may be no more than an inch. For parakeets and cockatiels, a total distance from the wall of the water storage container to the end of the manifold may be no more than two inches. For small-sized chicken breeds and guinea pigs, a total distance from the wall of the water storage container to the end of the manifold may be no more than four inches. For standard-sized chickens and rabbits, a total distance from the wall of the water storage container to the end of the manifold may be no more than six inches. For ducks, a total distance from the wall of the water storage container to the end of the manifold may be no more than eight inches. For turkeys, a total distance from the wall of the water storage container to the end of the manifold may be no more than elven inches. Other dimensions may be selected, without departing from the invention.

During the course of normal use, it may become necessary to clean the portable nipple based poultry waterer because sediments or minerals in the water collect in the manifold, or because bacteria builds up in the manifold over time. All water, including municipal tap water, contains some free-floating bacteria. These bacteria can attach themselves to the walls of a poultry waterer. Once attached, they form an anchor point for other strains of bacteria that could not adhere to the wall of the watering system on their own. Over time, more types of bacteria attach themselves to the wall and create a layer of slime or biofilm. This biofilm can then harbor a variety of bacteria, fungi and viruses that are both harmful to chickens and people including *E. coli* and *Campylobacter Jejuni* that cause food poisoning and diarrhea. One or more embodiments of he portable nipple based poultry waterer is designed to allow users to periodically clean the interior of these sediments and bacteria One option to clean sediment from one or more embodiments of the portable nipple based poultry waterer is to leave it attached to the water storage container and fill the water storage container partially full with clean water. The user would then rock the water container backward and forward several times to drive water into and out of the manifold in order to dislodge any sediment. The user would then empty out the tank of the water and sediment and refill it with fresh water for the poultry.

A similar operation can be performed with the objective of sanitizing the manifold of bacteria. In this case, the one or more embodiments of the poultry watering system are flushed as described above. However, the tank is filled with a sanitizing agent. Users can purchase various brands of sanitizers to eliminate bacteria, fungi and other microorganisms. A 10% solution of household bleach and 90% water is a cheap and readily available sanitizer that can also be used for this purpose. To sanitize the one or more embodiments of the portable nipple based poultry waterer, the user would pour the sanitizing liquid into the water storage container and then tip the container towards the portable poultry waterer so that the sanitizing fluid enters the manifold and drives out any air trapped inside the manifold. The user would then wait 10 minutes, at which point the sanitizing agent will have killed much of the bacteria and microorganisms trapped inside the manifold. The user would empty out the sanitizing solution and refill the container with clean water. The user would then drive any remaining sanitizing liquid from the manifold by filling the water storage container with clean water and rocking it forward and backward to drive water into and out of the manifold. By repeating this process several times, the sanitizing liquid can be substantially removed from the manifold. The portable poultry waterer would then be ready for use.

However, there may be cases when the above procedure is not sufficient to drive sediment out of the manifold or to eliminate the layer of biofilm if it has gotten particularly thick. In such a case, the user can open one, or more, of the clean out plugs located on the manifold according to one or more embodiments of the present invention and flush the system with a jet of water from a water faucet or hose. The user also has the option to use a bottlebrush, or similar cleaning instrument, along with some dishwashing detergent to gently scrub the interior of the manifold through one or more of the clean out holes as well as the through hole in the connector unit. After this mechanical cleaning of the interior surfaces, the user would wash away any detergent, replace the clean out plug(s) and sanitize the portable poultry waterer with a sanitizing agent as described above.

If the user prefers to do so, one or more embodiments of the portable nipple based poultry waterer can be removed from the water storage unit prior to cleaning or sanitizing. To do this, the user would unscrew the nut holding the portable nipple based poultry waterer to the water storage container, remove the gasket and washer and then withdraw the watering system from the hole in water storage container. Once removed, the user has the option to flush the unit with tap water from a faucet or hose, to clean the unit with a bottlebrush, and then to soak the portable nipple based poultry watering system and attachment fittings in a bucket or bowl containing sanitizing solution. Once clean and sanitized, the user would wash any sanitizing solution away and re-mount the portable poultry waterer on the water storage container.

While not described here, it should be understood that the exterior of the portable nipple based poultry system may be cleaned of any dirt that may have landed on the exterior of the unit with a sponge, paper towel or other cleaning tool and a combination of water, detergent and sanitizing solution using procedures similar to those described above.

As discussed above, one or more embodiments of the portable nipple based animal waterer is designed to prevent animals from roosting or sitting upon the manifold. This protects the portable animal waterer from damage due to the weight of the animal and also soiling of the exterior of the manifold by an animal sitting on top of the manifold. This anti-roosting feature will be operational regardless of the portable water storage container selected by the user.

The portable nipple based animal waterer supplies water to animals in a manner that is substantially closed to the open environment. Specifically, the water is drawn from a covered water storage container and then dispensed directly into the animal's mouths through poultry nipples. As a result, the animal's water supply is shielded from various contaminants in the environment. For example, chickens' natural behavior is to scratch the ground when they search for food. In the process, they kick dirt, debris, and their own droppings into the air and these contaminants can land in the animal's water supply if the water supply is exposed to the open air.

The portable nipple based animal waterer can provide birds with fresh water that is substantially free of contaminants and off-tastes. Research has shown that birds offered clean, taste-free, water tend to drink more. This is important because water is critical to animal health. As mentioned earlier, water is an important nutrient for poultry because it helps them regulate their body temperature and thus prevent heat stroke. It also helps poultry soften and digest their dry food that is substantially dry and in need of hydration. Many poultry owners are particularly interested in raising poultry for the eggs they produce. Eggs are 75% water by weight, so egg production is also dependent on birds getting adequate supplies of water.

In addition, the portable nipple based animal waterer may also slow, or prevent, the spread of disease among the animals. This is due to the fact that the water supply is also shielded from fecal contamination that is an agent for spreading diseases. By reducing the potential for contamination by dirt, debris, feces and microbes, the portable nipple based animal waterer can improve animal health, productivity and comfort.

Cleaner water is also a direct benefit to users of the portable nipple based animal waterer. Water that has become soiled with dirt and feces requires immediate cleaning. The portable nipple based animal waterer may reduce the probability of such contamination occurring. Rather than requiring daily cleaning, as is often the case when the water is exposed to the open air, the portable animal waterer may only require cleaning once per month or less frequently. Furthermore, the user is likely to find cleaning the portable nipple based animal waterer more pleasant because the cleaning tasks are more likely to be weighted towards light cleaning and sanitization than to heavy cleaning and the removal of dirt, debris and feces.

Importantly, the components incorporated into the portable nipple based animal waterer that allows user to clean the system are both simple and inexpensive. For example, one or more embodiments of the portable nipple based animal waterer uses only clean out holes and inexpensive clean out plugs to allow access to the interior of the unit to facilitate cleaning. As a result, the cost of the portable nipple based animal waterer, and the complexity of maintenance of those components, is quite minimal. For example, this is particularly advantageous to owners of small poultry flocks, who might consider more complex cleaning systems as uneconomical. Furthermore, no specific maintenance tasks are required to maintain the clean out plugs as might be required with more complex systems. In the event a user damages or loses a clean out plug, a replacement can be purchased very inexpensively and installed easily.

The mobility of the portable nipple based animal waterer represents an important advantage to users in a variety of ownership situations. For example, in urban environments, owners may keep poultry in a coop located on a rooftop where there is no immediate access to water. In such a situation, a user can fill the portable nipple based animal waterer at their residential faucet and then transport the portable animal waterer to a coop on the roof. In rural areas, the source of water may be distant from the place where the poultry are lodging. In this case, the portable animal waterer may be filled from the municipal water line connected to the user's residence or from a well adjacent to that residence and then transported to the poultry coop or pen. Some poultry owners allow their birds to roam freely in open areas called paddocks. The paddocks are separated by wire fences, stone walls, and/or other barriers. Owners typically move the poultry flock from one paddock to another over time, allowing the flock to forage for plants and bugs in one area and then transferring them to a new paddock when the poultry have depleted the resources in that area. In such a situation, the portable animal waterer can be moved along with the flock from one paddock to another. A similar situation exists for users who place their flocks in temporary pens generally referred to as chicken tractors. The chicken tractor is an enclosure on wheels. Poultry are placed into the enclosure during the day and allowed to forage. Typically, the chicken tractor is moved from location to location on the user's property for much the same reasons that poultry are moved from paddock to paddock. In such a situation, the portable animal waterer would be moved along with the tractor so as to ensure a supply of water for the birds.

The mobility of the portable nipple based animal waterer is also advantageous for users living in colder climates. The portable animal waterer can be placed outdoors during warm months and then moved into a heated pen or coop during the winter. If the user's pen or coop is not heated and the temperature falls to below freezing, the water in any animal watering system is likely to freeze. If the system is not mobile, removing the ice may be difficult or impossible. However, the portable nipple based animal waterer can be taken into a heated environment in order to thaw any ice that might develop inside the manifold or the water storage container. In environments where day-time temperatures are routinely below freezing, a user can use two portable animal waterers to ensure a continuous supply of water for the flock. In this case, the user would place one portable animal waterer outside for use by the poultry and keep the second portable animal waterer in a heated environment where it would not freeze. If the water in the first portable animal waterer freezes, the user could replace the frozen waterer with the one that was in the heated environment. By rotating the two portable animal waterers between outdoor and indoor environments, the user could ensure a continuous supply of liquid water for the poultry throughout the winter. Alternatively, users have the option to use one or more heating devices to keep the water inside the portable nipple based animal waterer and water storage container from freezing. A user can warm the water inside the water storage tank and portable nipple based animal waterer by drilling a hole in the outside of the water storage container and passing the heating device into the interior of the water storage vessel. The heating device can then be passed through the connector section of the portable nipple based animal waterer and into the manifold to keep the water inside the manifold and poultry nipples from freezing. The same warming effects can be achieved by passing the heating device through one of the clean out ports on the portable nipple based animal waterer and then through the connector section and into the water storage container. If a user chooses to deploy more than one heating device, they also have the option to place one or more heating devices inside the manifold of the portable nipple based animal waterer and one or more heating devices inside the water storage tank. In such an arrangement, it is not necessary to pass the heating device through the connector section of the portable nipple based animal waterer.

As has been described earlier, one or more embodiments of the portable nipple based animal waterer allow users to choose from a very wide range of water storage containers. This is advantageous because it allows users to choose a water reservoir that meets their specific needs including: dimensional size, water capacity, durability, aesthetics and price. Users can purchase a water storage container, or can re-purpose a container that they already own, making the portable nipple based animal waterer a very inexpensive and flexible option for such users. Users can also attach the portable nipple based animal waterer to different water storage containers over time, allowing them to adapt the system to their changing needs.

Finally, the portable nipple based animal waterer deters animals from roosting or sitting on the manifold without incorporating dedicated anti-roosting components and systems into the design. Rather, the portable nipple based animal waterer uses its own proximity to the water storage tank as the mechanism to prevent this roosting or sitting. As such, the design of the portable nipple based animal waterer is simple and does not require incorporation of mechanical or electric elements that would add cost, complexity and maintenance tasks for the user. Such a system might be particularly attractive to owners of small poultry flocks who would view dedicated anti-roosting components and systems as uneconomical or overly complex for their needs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A portable animal waterer, comprising:
a bulbous manifold formed from a manifold wall, wherein the bulbous manifold is configured to hold a fluid;
a connector formed from an extension of the bulbous manifold,
wherein the bulbous manifold is connected to a portable water container using the connector,
wherein the connector enters the portable water container at a wall of the portable water container, surface-normal to the wall of the portable water container, and
wherein the bulbous manifold is supported by the portable water container;
a first valve hole disposed on the bulbous manifold in the manifold wall in a first plane tangential to the manifold wall at the first valve hole, wherein the first valve hole is configured to receive a first valve; and
a second valve hole disposed on the bulbous manifold in the manifold wall in a second plane tangential to the manifold wall at the second valve hole, opposite to the first valve hole,
wherein the second valve hole is configured to receive a second valve, and
wherein the second plane is parallel to the first plane.
2. The portable animal waterer of claim 1, wherein the connector further comprises:
a through-hole configured to allow fluids to pass therethrough;
a flange section disposed on the connector and adjacent to the bulbous manifold; and
a threaded portion of the connector, distal to the flange, with a diameter and thread configured to connect to a nut,
wherein an outer diameter of the flange section is larger than an outer diameter of the threaded portion.

3. The portable animal waterer of claim 2, wherein the flange section is formed by a continuous extension of the bulbous manifold.

4. The portable animal waterer of claim 2, wherein the flange section is formed by a dedicated widening section of the connector, wherein the dedicated widening section is disjointed from the bulbous manifold.

5. The portable animal waterer of claim 2, wherein the connector is straight.

6. The portable animal waterer of claim 2, wherein the connector comprises a bend.

7. The portable animal waterer of claim 2, further comprising a heating element.

8. The portable animal waterer of claim 7, wherein the heating element extends into the bulbous manifold through the connector.

9. The portable animal waterer of claim 1, wherein the connector that enters the portable water container is secured using the nut engaging with the threaded portion of the connector inside the portable water container.

10. The portable animal waterer of claim 1, further comprising a gasket, disposed between the flange section and the wall of the portable water container, providing a watertight seal.

11. The portable animal waterer of claim 1,
wherein, the first and the second valve holes are located in planes that are perpendicular to a ground surface on which the portable water container is placed.

12. The portable animal waterer of claim 1,
wherein, the bulbous manifold extends no further than one selected from the group consisting of one, two, four, six, eight and eleven inches from the wall of the portable water container.

13. The portable animal waterer of claim 1, further comprising a third valve hole disposed on the bulbous manifold in the manifold wall, between the first valve hole and the second valve hole, wherein the third valve hole is configured to receive a third valve, oriented differently than the first and the second valve.

14. The portable animal waterer of claim 1, further comprising:
a clean-out plug hole disposed on the bulbous manifold in the manifold wall and located opposite to the connector.

15. The portable animal waterer of claim 14, wherein the clean-out plug hole is configured to receive one selected from the group consisting of a clean-out plug, a ball valve, a heater, and a valve.

16. The portable animal waterer of claim 1, further comprising a pad, disposed surrounding the first valve hole and forming a thickened manifold wall with a flat outside surface.

17. The portable animal waterer of claim 1, wherein the first valve hole is configured to accommodate a locking mechanism of the first valve.

18. A method to manufacture a portable animal waterer, the method comprising:
providing a bulbous manifold formed from a manifold wall, the bulbous manifold comprising an extension that forms a connector,
wherein the bulbous manifold is configured to hold a fluid,
wherein the bulbous manifold is connected to a portable water container using the connector,
wherein the connector enters the portable water container at a wall of the portable water container, surface-normal to the wall of the portable water container, and
wherein the bulbous manifold is supported by the portable water container;
disposing a first valve hole on the bulbous manifold in the manifold wall in a first plane tangential to the manifold wall at the first valve hole;
disposing a second valve hole on the bulbous manifold in the manifold wall in a second plane tangential to the manifold wall at the second valve hole,
wherein the second valve hole is located opposite to the first valve hole, on the bulbous manifold,
wherein the second plane is parallel to the first plane; and
installing a first and a second valve in the first and the second valve hole, respectively.

19. The method to manufacture the portable animal waterer of claim 18, wherein the bulbous manifold comprising the extension that forms the connector is manufactured using a blow-molding process.

* * * * *